US010587005B2

(12) United States Patent
Li et al.

(10) Patent No.: US 10,587,005 B2
(45) Date of Patent: Mar. 10, 2020

(54) SOLID ELECTROLYTE COMPOSITIONS

(71) Applicant: Wildcat Discovery Technologies, Inc., San Diego, CA (US)

(72) Inventors: Bin Li, San Diego, CA (US); Marissa Caldwell, Minneapolis, MN (US); Prabhakar Tamirisa, Brooklyn Park, MN (US); Hui Ye, Maple Grove, MN (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 382 days.

(21) Appl. No.: 15/085,924

(22) Filed: Mar. 30, 2016

(65) Prior Publication Data
US 2017/0288264 A1 Oct. 5, 2017

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0028* (2013.01)

(58) Field of Classification Search
CPC ......... H01M 10/0565; H01M 10/0525; H01M 2300/0028
See application file for complete search history.

(56) References Cited

U.S. PATENT DOCUMENTS

| | | | |
|---|---|---|---|
| 3,271,199 A | 9/1966 | Hermann et al. | |
| 4,645,726 A | 2/1987 | Hiratani et al. | |
| 5,154,992 A | 10/1992 | Berberick et al. | |
| 5,223,353 A | 6/1993 | Ohsawa et al. | |
| 6,063,526 A | 5/2000 | Gan et al. | |
| 6,203,949 B1 | 3/2001 | Ehrlich | |
| 6,225,002 B1 | 5/2001 | Nimon et al. | |
| 6,645,675 B1 | 11/2003 | Munshi | |
| 6,673,273 B2 | 1/2004 | Le et al. | |
| 7,129,005 B2 | 10/2006 | Wensley et al. | |
| 7,422,826 B2 * | 9/2008 | Xing | H01M 4/485 429/304 |
| 8,026,002 B2 | 9/2011 | Rong et al. | |
| 8,227,105 B1 | 7/2012 | Rex et al. | |
| 8,501,339 B2 | 8/2013 | Visco et al. | |
| 8,524,397 B1 | 9/2013 | Yumoto et al. | |
| 10,135,093 B2 * | 11/2018 | Li | C08J 3/09 |
| 2001/0018150 A1 * | 8/2001 | Morita | H01M 4/133 429/231.8 |
| 2001/0033974 A1 * | 10/2001 | Gavelin | H01M 10/052 429/306 |
| 2002/0160269 A1 | 10/2002 | Choi et al. | |
| 2002/0197536 A1 | 12/2002 | Mori et al. | |
| 2003/0104282 A1 | 6/2003 | Xing et al. | |
| 2005/0255385 A1 | 11/2005 | Harrup et al. | |
| 2006/0093921 A1 * | 5/2006 | Scott | A61N 1/378 429/245 |
| 2006/0154144 A1 | 7/2006 | Gorkovenko et al. | |
| 2006/0210873 A1 | 9/2006 | Hollenkamp et al. | |
| 2007/0015048 A1 | 1/2007 | Lee et al. | |
| 2007/0054186 A1 | 3/2007 | Costello et al. | |
| 2007/0099089 A1 * | 5/2007 | Miura | C08G 65/14 429/307 |
| 2008/0241665 A1 | 10/2008 | Sano | |
| 2008/0248375 A1 * | 10/2008 | Cintra | H01M 4/131 429/94 |
| 2009/0317725 A1 | 12/2009 | Jiang et al. | |
| 2010/0021815 A1 | 1/2010 | Oh et al. | |
| 2010/0075215 A1 | 3/2010 | Zhang | |
| 2010/0141881 A1 | 6/2010 | Batistatos et al. | |
| 2010/0273062 A1 | 10/2010 | Tsuchida et al. | |
| 2011/0003211 A1 | 1/2011 | Hudson et al. | |
| 2011/0076570 A1 | 3/2011 | Hama et al. | |
| 2011/0117442 A1 * | 5/2011 | Kim | H01M 4/382 429/314 |
| 2012/0058398 A1 * | 3/2012 | Balaji | H01M 10/0565 429/303 |
| 2012/0107697 A1 | 5/2012 | Roh et al. | |
| 2012/0110835 A1 | 5/2012 | Hudson et al. | |
| 2013/0011745 A1 | 1/2013 | Johnson et al. | |
| 2013/0019468 A1 | 1/2013 | Ramasubramanian et al. | |
| 2013/0065122 A1 | 3/2013 | Chiang et al. | |
| 2013/0084507 A1 | 4/2013 | Johnson | |
| 2013/0108934 A1 | 5/2013 | Lee et al. | |
| 2013/0134566 A1 | 5/2013 | Ding et al. | |
| 2013/0142943 A1 | 6/2013 | Kubo et al. | |
| 2013/0143134 A1 | 6/2013 | Mizuno et al. | |
| 2013/0189589 A1 | 7/2013 | Hashaikeh et al. | |

(Continued)

FOREIGN PATENT DOCUMENTS

| | | |
|---|---|---|
| CN | 1941219 A | 4/2007 |
| CN | 101183727 A | 5/2008 |

(Continued)

OTHER PUBLICATIONS

JP 2013254647 MT (Year: 2013).*
Henderson, "Cystallization Kinetics of Glyme-LiX and PEO-LiX Polymer Electrolytes", Macromolecules, 2007, vol. 40, pp. 4963-4971.
International Search Report and Written Opinion dated Oct. 23, 2015 in International application No. PCT/US2015/035918.
Wang et al., "Interface Properties Between Lithium Metal and a Composite Polymer Electrolyte of PEO18Li (CF3SO2) 2 N-Tetraethylene Glycol Dimethyl Ether", Membranes, vol. 3, No. 4, Oct. 25, 2013, pp. 298-310.

(Continued)

*Primary Examiner* — Alexander Usyatinsky

(74) *Attorney, Agent, or Firm* — Philip S. Hof; The Small Patent Law Group, LLC

(57) ABSTRACT

A battery having an anode, a soft-solid electrolyte, and a cathode. The soft-solid electrolyte includes a polymer soft-solid material formed from polymer combined with a solvent such as butylene carbonate, butyl sulfoxide, n-methyl-2-pyrrolidone, or γ-caprolactone.

13 Claims, 2 Drawing Sheets

(56) References Cited

U.S. PATENT DOCUMENTS

| | | |
|---|---|---|
| 2013/0330649 A1 | 12/2013 | Takane et al. |
| 2013/0344367 A1 | 12/2013 | Chiang et al. |
| 2013/0344397 A1 | 12/2013 | Visco et al. |
| 2014/0023936 A1 | 1/2014 | Belharouak et al. |
| 2014/0072881 A1 | 3/2014 | Park et al. |
| 2014/0278168 A1 | 9/2014 | Rogers |
| 2014/0287324 A1 | 9/2014 | Tsuchida et al. |
| 2014/0315097 A1 | 10/2014 | Tan et al. |
| 2015/0024279 A1 | 1/2015 | Tan et al. |
| 2015/0047767 A1 | 2/2015 | Sane |
| 2015/0311532 A1 | 10/2015 | Chen et al. |
| 2015/0364773 A1 | 12/2015 | Tamirisa et al. |
| 2016/0141718 A1 | 5/2016 | Ye et al. |
| 2017/0288265 A1* | 10/2017 | Li ................................ C08J 3/09 |

FOREIGN PATENT DOCUMENTS

| | | |
|---|---|---|
| CN | 100470685 | 3/2009 |
| CN | 103035947 | 1/2013 |
| CN | 103093965 | 1/2013 |
| CN | 104538670 A | 4/2015 |
| EP | 0651455 A1 | 5/1995 |
| EP | 0981175 A2 | 2/2000 |
| EP | 1231655 A1 | 8/2002 |
| EP | 0978889 B1 | 10/2003 |
| EP | 2587585 A1 | 5/2013 |
| JP | H11329393 A | 11/1999 |
| JP | 2000195494 A | 7/2000 |
| JP | 2003242964 A | 8/2003 |
| JP | 2013254647 * | 12/2013 |
| WO | 1992002967 A1 | 2/1992 |
| WO | 1999010165 A1 | 3/1999 |
| WO | 1999054953 A1 | 10/1999 |
| WO | 2000038263 A1 | 6/2000 |
| WO | 2001017052 A2 | 3/2001 |
| WO | 2002061872 A1 | 8/2002 |
| WO | 2005043649 A1 | 5/2005 |
| WO | 2008098137 A2 | 8/2008 |
| WO | 2009108185 A1 | 9/2009 |
| WO | 2011014818 A1 | 2/2011 |
| WO | 2011157489 A1 | 12/2011 |
| WO | 2013062991 A1 | 5/2013 |
| WO | WO 2013/062991 * | 5/2013 |
| WO | 2013134566 A2 | 9/2013 |
| WO | 2013154623 A1 | 10/2013 |
| WO | 2014020349 A1 | 2/2014 |

OTHER PUBLICATIONS

International Search Report & Written Opinion dated Jun. 15, 2017 in International application No. PCT/US2017/024756.

* cited by examiner

SOLID ELECTROLYTE COMPOSITIONS

BACKGROUND OF THE INVENTION

The present invention is in the field of battery technology and, more particularly, in the area of solid polymeric materials and composites for use in electrodes and electrolytes in electrochemical cells.

Conventional lithium ion batteries include a positive electrode (or cathode as used herein), a negative electrode (or anode as used herein), an electrolyte, and, frequently, a separator. The electrolyte typically includes a liquid component that facilitates lithium ion transport and, in particular, enables ion penetration into the electrode materials.

In contrast, so-called solid-state lithium ion batteries do not include liquid in their principal battery components. Solid-state batteries can have certain advantages over liquid electrolyte batteries, such as improvements in safety because liquid electrolytes are often volatile organic solvents. Solid-state batteries offer a wider range of packaging configurations because a liquid-tight seal is not necessary as it is with liquid electrolytes.

Generally, batteries having a solid-state electrolyte can have various advantages over batteries that contain liquid electrolyte. For small cells, such as those used in medical devices, the primary advantage is overall volumetric energy density. For example, small electrochemical cells often use specific packaging to contain the liquid electrolyte. For a typical packaging thickness of 0.5 mm, only about 60% of the volume can be used for the battery with the remainder being the volume of the packaging. As the cell dimensions get smaller, the problem becomes worse.

Elimination of the liquid electrolyte facilitates alternative, smaller packaging solutions for the battery. Thus, a substantial increase in the interior/exterior volume can be achieved, resulting in a larger total amount of stored energy in the same amount of space. Therefore, an all solid-state battery is desirable for medical applications requiring small batteries. The value is even greater for implantable, primary battery applications as the total energy stored often defines the device lifetime in the body.

Further, soft-solid state batteries can use lithium metal as the anode, thereby dramatically increasing the energy density of the battery as compared to the carbon-based anodes typically used in liquid electrolyte lithium ion batteries. With repeated cycling, lithium metal can form dendrites, which can penetrate a conventional porous separator and result in electrical shorting and runaway thermal reactions. This risk is mitigated through the use of a solid nonporous electrolyte.

The electrolyte material in a soft-solid-state lithium ion battery can be a polymer. Suitable polymers have the ability to conduct lithium ions. The solid electrolyte is typically formulated by adding a lithium ion salt to the polymer in advance of building the battery, which is a formulation process similar to liquid electrolytes.

However, solid-state batteries have not achieved widespread adoption because of practical limitations. For example, while polymeric solid-state electrolyte materials like poly(ethylene oxide) ("PEO") are capable of conducting lithium ions, their ionic conductivities are inadequate for practical power performance. Successful solid-state batteries require thin film structures, which reduce energy density, and thus have limited utility.

Certain embodiments of the invention disclosed herein provide novel formulations for solid-state electrode films.

BRIEF SUMMARY OF THE INVENTION

Certain embodiments of the invention include a lithium battery having an anode, a cathode including an electrode active material, and an electrolyte film including a polymer gel. The polymer gel can include and/or be formed from a solvent selected from butylene carbonate, butyl sulfoxide, n-methyl-2-pyrrolidone, or γ-caprolactone.

In some embodiments, the solvent is butylene carbonate. In some embodiments, the solvent is butyl sulfoxide. In some embodiments, the solvent is n-methyl-2-pyrrolidone. In some embodiments, the solvent is γ-caprolactone.

The lithium ion battery includes an ion conducting salt, such as a lithium salt. In some embodiments, the lithium salt comprises lithium bis(trifluoromethanesulfonyl)imide. In some embodiments, the lithium salt comprises lithium tetrafluoroborate.

Certain embodiments of the invention include a method of making a soft-solid electrolyte. The method includes forming a liquid precursor by suspending at least 15 molar percent of a lithium salt in a liquid solvent. The method includes combining an ethylene oxide polymer and the liquid precursor to form a gel. The gel is annealed.

In some embodiments, combining the ethylene oxide polymer and the liquid precursor is done via mechanical milling. In some embodiments, the annealing is done at less than about 90 degrees Celsius.

DETAILED DESCRIPTION OF THE INVENTION

Figure 1A:
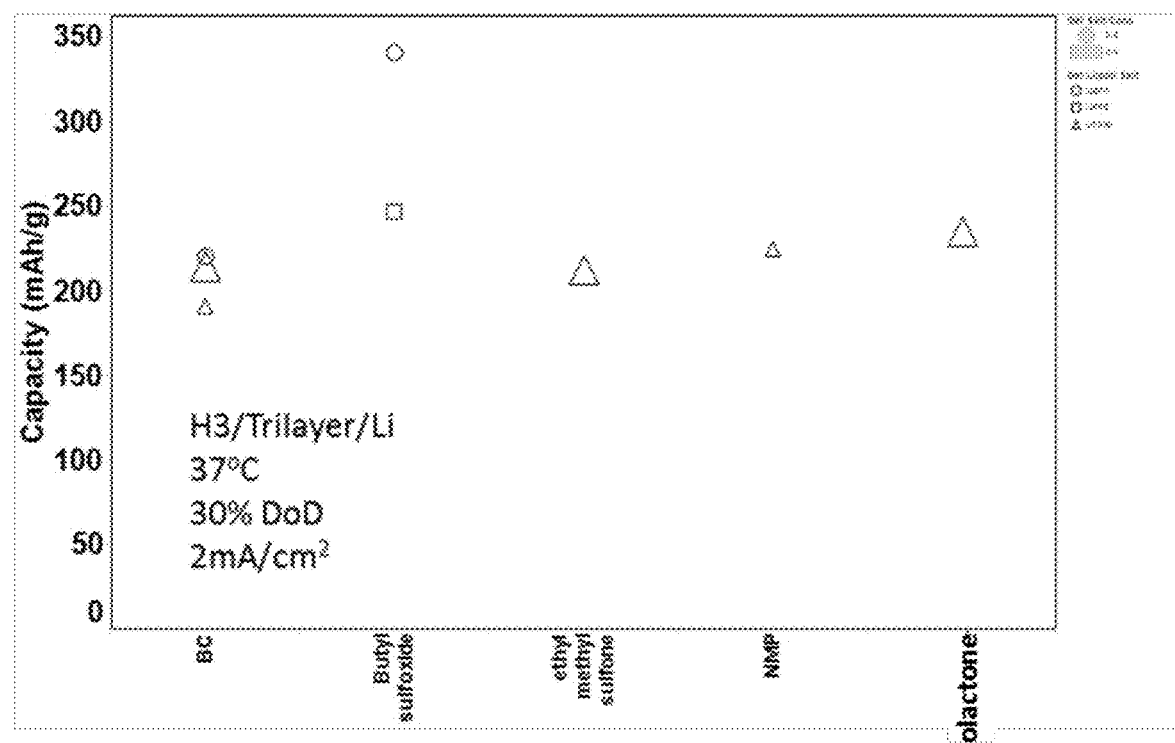
FIG. 1A illustrates the results of electrochemical testing of soft-solid electrolyte formulations according to certain embodiments of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A "C-rate" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The terms "solid electrolyte" or "soft-solid electrolyte" as used herein are used primarily to distinguish from electrolyte formulations where the formulation is an entirely liquid phase, almost entirely liquid phase, or substantially liquid phase.

Ranges presented herein are inclusive of their endpoints. Thus, for example, the range 1 to 3 includes the values 1 and 3 as well as intermediate values.

Solid-state batteries can be formed using polymeric materials with ion conducting properties. The polymeric materials can be used in the soft-solid electrolyte formulation that is used to conduct ions from one electrode to another. The polymeric material should have suitable mechanical properties and thermal stability, in addition to the desired level of ionic conductivity, and specifically lithium ion conductivity.

As with other applications using polymeric materials, the properties of the soft-solid structure of the polymeric material can be influenced by (i) the choice of polymer, (ii) the molecular weight of the polymer, (iii) the polydispersity of the polymer, (iv) the processing conditions, and (v) the presence of additives. While combinations of these factors are generally known, it is not necessarily predictable how these various factors will interact in a given application. Certain polymeric materials have shown utility for use in a soft-solid electrolyte formulations based on the combination of factors listed above.

Poly(ethylene oxide) ("PEO") is a suitable polymeric material for use in lithium ion solid-state batteries. PEO is a commodity polymer available in a variety of molecular weights. PEO can range from very short oligomers of about 300 g/mol (or 300 Da) to very high molecular weights of 10,000,000 g/mol (or 10,000 kDa). At molecular weights of 20 kDa and below, PEO is typically referred to as poly(ethylene glycol) or PEG. PEO has been used as a separator in conventional liquid electrolyte systems and, as described above, as a component in a thin film solid electrolyte. The use of PEO as a separator in conventional liquid electrolyte systems is technically distinct from the use described herein, and such use in separators is not predictive of the results achieved by certain of the embodiments disclosed herein.

PEO processed into any structure, whether intended for a solid-state battery or not, can have both crystalline and amorphous domains. Ionic conductivity happens more readily in the amorphous domains and, therefore, processing conditions that decrease crystalline domain size and/or the overall amount of crystallinity are preferred for uses of PEO that include soft-solid electrolyte formulations. Some research has used carbonate solvents, such as ethylene carbonate, dimethyl carbonate, or diethyl carbonate, as plasticizers to improve ionic transport and reduce interfacial impedance. However, this involves the addition of a volatile, flammable solvent to the battery and negates much of the safety benefits brought by a solid-state electrolyte. In PEO systems, PEG can be added to achieve the desired processing properties, such as a preferred solution viscosity, film modulus, or film glass transition temperature.

While PEO is discussed herein as a preferred polymeric material, it is understood that other polymers with equivalent chemical, electrochemical, mechanical, and/or thermal properties can be used in place of or in addition to PEO and/or PEO/PEG mixtures. Further, copolymers that include PEO, PEG, or PEO-like polymers in at least one segment of the copolymer can be suitable for certain embodiments described herein. Thus, the embodiments described herein that refer to PEO or PEO/PEG are understood to encompass other such polymeric and co-polymeric materials. Further, the embodiments described herein that refer to PEO or PEO/PEG are understood to encompass routine chemical modifications to the chemical structure of the PEO or PEO/PEG, where such routine chemical modifications do not substantially alter the structure, conductivity, and/or utility of the PEO or PEO/PEG.

PEO and PEG can be represented as structure (a):

(a)

where n indicates the number of repeat units in the polymer chain. PEO and PEG can be referred to as an "ethylene oxide" polymer. And, the variations of PEO and PEG can be represented as structure (b):

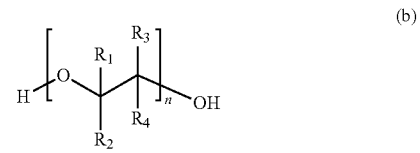

(b)

where $R_1$, $R_2$, $R_3$, and $R_4$ represent examples of the site of substitution that may be considered within the scope of the embodiments disclosed herein. Routine substitutions of groups including, but not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions. Thus, "ethylene" oxide polymers embrace PEO, PEO/PEG, and the various modifications contemplated herein.

The preferred salt and solvent formulations were identified using a series of analytical methods, beginning with selection of salts and solvents having desirable properties. For solvents, the following properties are desirable: (1) high boiling point and/or high molecular weight, which typically correlate with comparatively low volatility; (2) comparatively high dielectric constant; (3) comparatively high salt solubility; and (4) chemical stability on lithium metal. For salts, the following properties are desirable: (1) a comparatively high degree of dissociation, which is typically correlated with comparatively high solubility of the salt; (2) a comparatively bulky anion☐, which is typically correlated with a comparatively high lithium ion transference number; and (3) stability on lithium metal.

Certain solvent families have constituent members that exhibit one or more of the solvent properties listed above. For example, carbonates, such as diethyl carbonate, dipropyl carbonate, diisopropyl carbonate; cyclic carbonates, such as ethylene carbonate, propylene carbonate, butylene carbonate, fluoroethylene carbonate; amides such as dimethyl acetamide, N-methyl acetamide, N-methyl-2-pyrrolidone; nitriles, such as methoxyl propionitrile, adiponitrile, glutaronotrile, succinonitrile, benzonitrile; sulfites, such as diethylsulfite, propylene glycol sulfite; sulfones, such as sulfolane, ethyle methyl sulfone, diethyl sulfone, dimethyl sulfone; sulfoxides, such as butyl sulfoxide; esters, such as propyl butyrate, dimethyl malonate, butyl propionate, pentyl acetate; lactones, such as γ-valerolactone, γ-butyrolactone; glyme ethers, such as diglyme, trugylme, tertraglyme, 1,2-diethoxyethane, hexaglyme; cyclic ethers, such as 1,4-dioxane; crown ethers, such as 18-crown-6 ether.

The lithium salts used to create the improved soft-solid electrolytes disclosed herein include, but are not limited to, lithium bis(trifluoromethanesulfonyl)imide ($CF_3SO_2NLiSO_2CF_3$) (also referred to herein as "LiTFSI"), lithium tetrafluoroborate ($LiBF_4$), lithium hexafluoroarsenate ($LiAsF_6$), lithium bis(oxalato)borate ($LiB(C_2O_4)_2$) (also referred to herein as "LiBOB"), lithium chlorate ($LiClO_4$), lithium hexafluorophosphate ($LiPF_6$), and lithium triflate ($LiCF_3SO_3$). Preferably, lithium bis(trifluoromethanesulfonyl)imide and lithium tetrafluoroborate are used in the soft-solid electrolyte formulations.

Conventional liquid solvents used in the solid state electrolyte include glyme ethers, such as diethylene glycol dimethyl ether ("diglyme" or "G2"), triethylene glycol dimethyl ether ("tricglyme" or "G3"), tetraethylene glycol dimethyl ether ("tetraglyme" or "G4").

The liquid components used to create the improved soft-solid electrolytes disclosed herein include, but are not limited to, butylene carbonate (represented as structure (a)):

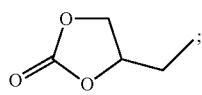

butyl sulfoxide (represented as structure (b)):

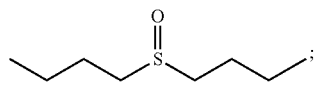

n-methyl-2-pyrrolidone (NMP) (represented as structure (c)):

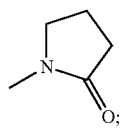

and γ-caprolactone (represented as structure (d)):

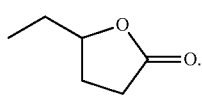

The liquid components disclosed herein are understood to encompass routine chemical modifications to their chemical structure, where such routine chemical modifications do not substantially alter the structure, conductivity, and/or utility of the liquid component.

The volatility of salt/solvent combinations was calculated gravimetrically by weighing vessels with solvents, lithium salt/solvent complexes, or formulations before and after exposure to elevated temperature of 160 degrees Celsius under vacuum (⌊30 in Hg) for 4 hours. For salts with decomposition temperature less than 180 degrees Celsius, 37 degrees Celsius was used for evaluation instead of 160 degrees Celsius. The electrolyte exposed surface area to volume ratio was kept constant. All materials were prepared under argon prior to volatility testing to avoid moisture pickup prior to the measurement. The gravimetric method was able to distinguish differences in weight loss, and thus volatility, for varying formulations with good reproducibility.

Salt/solvent compositions were evaluated for volatility and ionic conductivity, followed by tests of the pulse power test in a cell. Volatility screening on flowing salt/solvent compositions was done using versus a control. Some salt/solvent compositions did not flow and were eliminated from the testing. For volatility, a 20% normalized weight loss or less is desirable. In general, LiTFSI showed lowest volatility compared to all other salts in many of the tested solvents. Combinations with PEG DME (Mw=500), methoxy propionitrile, and butyl sulfoxide also had low volatility with certain salts other than LiTFSI. In sum, salt choice has strong effect on volatility.

Ionic conductivities of the salt/solvent combinations were also tested according to the method described below. An ionic conductivity of at least 0.1 mS/cm is desirable. In general, the ionic conductivities of 20 molar % salt formulation were greater than those of 40 molar % salt. However, there was no strong dependency on the type of salt. Most formulations had adequate conductivity, which does not appear to be a limiting performance factor.

Data for all the key metrics for the screened formulations were acquired and analyzed. Most cells showed an expected open circuit voltage of at least 3V. However, the ability to discharge was solvent dependent, with solvents in the same family often showing similar performance. Glyme ethers and lactones worked well, while carbonates and nitriles generally performed poorly. For the solvents that are able to discharge well, most salts could yield good discharge capacity For good performing solvents, most salts can give good discharge capacity. Interestingly, there was not a good correlation between ionic conductivity and the ability to discharge, indicating there may be high interfacial impedance or incomplete wetting on the lithium surface. Cells with high capacity can also show higher average voltage for some formulations illustrating a reduced underpotential. The solvent family has a strong impact on the power performance of the cells. Like capacity, power did not correlate with conductivity.

The preferable salt/solvent compositions were combined with polymer. Among the most preferable combinations of polymer, lithium salt, and liquid component for use as a soft-solid electrolyte formulation are the following: poly(ethylene oxide)/bis(trifluoromethanesulfonyl)imide/butylene carbonate; poly(ethylene oxide)/lithium tetrafluoroborate/butylene carbonate; poly(ethylene oxide)/lithium tetrafluoroborate/butyl sulfoxide; poly(ethylene oxide)/bis (trifluoromethanesulfonyl)imide/n-methyl-2-pyrrolidone; and poly(ethylene oxide)/bis(trifluoromethanesulfonyl)imide/γ-caprolactone.

The preferred poly(ethylene oxide) polymer can have a weight average molecular weight ($M_w$) in the range of about 300 Daltons to about 10,000,000 Daltons (10M Da). Although the molecular weight of the poly(ethylene oxide) may not have a critical value for the property of voltage stability, the molecular weight of the poly(ethylene oxide) is more important for other properties, such as the mechanical stability of the films. The typical $M_w$ value for the PEO used in examples and embodiments disclosed herein is 5,000,000 Daltons (5M Da). Other values may be suitable.

The polymer is incorporated in the soft-solid electrolyte formulation in a weight percent (of the total weight of the formulation) of at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95%. More preferably, the polymer is incorporated in the soft-solid electrolyte formulation at a weight percent of at least 60%, at least 61%, at least 62%, at least 63%, at least 64%, at least 65%, at least 66%, at least 67%, at least 68%, or at least 69%. Still more preferably, the polymer is incorporated in the soft-solid electrolyte formulation at a weight percent of between about 63% and about 64%.

In some embodiments, other solid components are incorporated in the electrolyte formulation with the goal of enhancing the mechanical properties of the final electrolyte. Such solid components can be powders or particles of comparatively higher strength materials. The powders can be nano-scale, micro-scale, or larger. Of particular utility are ceramic powders or particles, including, but not limited to, silica, alumina, and similar ceramic materials. Advantageously, including these materials can improve the mechanical properties of electrolytes with relatively lower amounts of polymer in them, such as less than 50 weight % polymer.

The lithium salt and the liquid component are combined to form a liquid precursor portion of the electrolyte formulation. The liquid precursor portion includes an amount of salt that is at least 5 molar %, at least 10 molar %, at least 15 molar %, at least 20 molar %, at least 25 molar %, at least 30 molar %, at least 35 molar %, at least 40 molar %, at least 45 molar %, or at least 50 molar %, where the molar % is the molar fraction of the salt in the liquid precursor portion of the formulation and does not include the polymer portion of the formulation. In some embodiments, the amount of salt in the liquid precursor portion includes from about 15 molar % to about 25 molar %. In some embodiments, about 20 molar % of salt in the liquid precursor portion is preferred. In some embodiments, the amount of salt in the liquid precursor portion includes from about 35 molar % to about 45 molar %. In some embodiments, about 40 molar % of salt in the liquid precursor portion is preferred.

Among the various combination of salt and liquid component disclosed above, several were included in soft-solid electrolyte formulations that demonstrated good electrochemical performance as compared to similar formulations at different molar ratios. For example, 20 molar % lithium bis(trifluoromethanesulfonyl)imide in butylene carbonate and 40 molar % lithium bis(trifluoromethanesulfonyl)imide in butylene carbonate demonstrated favorable electrochemical properties, as did 20 molar % lithium tetrafluoroborate in butylene carbonate, 20 molar % lithium tetrafluoroborate in butyl sulfoxide, 20 molar % lithium bis(trifluoromethanesulfonyl)imide in n-methyl-2-pyrrolidone, and 40 molar % lithium bis(trifluoromethanesulfonyl)imide in γ-caprolactone. Each of these was formulated with poly(ethylene oxide) to make a soft-sold electrolyte film.

The combinations of materials disclosed herein are used to formulate polymer composite electrolyte systems with desirable ionic and electronic conductivity, low volatility, and desirable battery cell performance.

The solid-state batteries formed using the solid electrolyte formulations disclosed herein can be used with electrode configurations and materials known for use in solid-state batteries. The active material for use in the cathode can be any active material or materials useful in a lithium ion battery cathode, including the active materials in lithium metal oxides or layered oxides (e.g., Li(NiMnCo)O$_2$), lithium rich layered oxide compounds, lithium metal oxide spinel materials (e.g., LiMn$_2$O$_4$, LiNi$_{0.5}$Mn$_{1.5}$O$_4$), olivines (e.g., LiFePO$_4$, etc.). Preferred cathode active materials include lithium cobalt oxide (e.g., (LiCoO$_2$) and lithium titanium oxide (e.g., Li$_4$Ti$_5$O$_{12}$, Li$_2$TiO$_3$). Active materials can also include compounds such as silver vanadium oxide (SVO), metal fluorides (e.g., CuF$_2$, FeF$_3$), and carbon fluoride (CF$_x$). The finished cathode can include a binder material, such as poly(tetrafluoroethylene) (PTFE). More generally, the active materials for cathodes can include phosphates, fluorophosphates, fluorosulfates, silicates, spinels, and composite layered oxides. The materials for use in the anode can be any material or materials useful in a lithium ion battery anode, including lithium-based, silicon-based, and carbon-based anodes.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Examples

Preparation of Soft-Solid Electrolyte Films.

Electrolytes were fabricated using a multi-step process. A lithium salt was suspended in the liquid solvent component at the desired mole percentage via mechanical shaking of the salt/solvent mixture for a period of at least six hours, but typically overnight, under an argon atmosphere. The salt/solvent suspension was then combined, via low energy mechanical milling in air, with the desired weight percentage of PEO. In some cases the desired weight percentage of PEO was roughly 63 percent. When a stable gel was formed, the resulting gel was annealed under vacuum for about 48 hours at about 87 degrees Celsius. Following annealing, the gel was calendared to a desired thickness, which in some cases was about 50 microns. The self-supported electrolyte was layered on both sides of a Celgard separator and then punched to the appropriate size for electrochemical testing. A trilayer with the Celgard separator was then prepared by calendaring a sandwich of the electrolyte and the separator to about 120 microns thickness. The Celgard 3501 separator is 20 microns thick, leaving 100 microns of solid electrolyte.

Cathode Assembly.

Cathodes were formulated in a step-wise fashion. Carbon fluoride (CFx) and silver vanadium oxide (SVO) hybrid cathode mixtures were prepared by hand mixing powders of each component with a binder (such as poly(tetrafluoroethylene) (PTFE), carbon black (Super P Li), isopropanol, and water. An exemplary ratio of these components is 37 weight percent CFx, 53 weight percent SVO, 6 weight percent PTFE and 4 weight percent carbon black (weight percentages refer to the total weight of the mixture). Other ratios of these components are within the scope of this disclosure. The resulting mixture was dried at 275 degrees Celsius for about 4 hours under vacuum and then combined with a polymer by mechanical milling at low energy. An exemplary formula is 93.7 weight percent of the CFx/SVO/PTFE/carbon black cathode mix combined with 6.3 weight percent PEO. A 50 molar lithium bis(trifluoromethanesulfonyl)imide in tetraethylene glycol dimethyl ether solution was added to this milled mixture and mixed further by mechanical milling at low energy. The content of this final mixture is 65.01 weight percent of the CFx/SVO/PTFE/carbon black cathode mix, 4.37 weight percent PEO, and 30.62 weight percent LiTFSI-tetraglyme. The resulting mixture was dried under vacuum overnight. The resulting material was calendared to the desired thickness and punched to the appropriate diameter. In some case, a preferred thickness of the calendered cathode material is 0.7 mm. To the extent the cathode films are non⌊porous after being pressed, cathode films are expected to have a constant density with thickness. Otherwise, the cathode films will be expected to have a near-constant density with thickness.

Cell Assembly.

Lithium metal anodes were also punched to the appropriate diameters. Each cell contained the composite cathode, the supported electrolyte, and lithium foil anode assembled in a CR2032 coin cell. In some cases, the assembled cell stack was annealed at 70 degrees Celsius for 2 hours with low pressure applied. The battery cell was sealed.

Multi-Current Pulse Train for Solid State Cell Testing.

A ten-step pulse train was used as follows: Step 1, open circuit voltage (OCV) for 12 hours; Step 2, discharge at C/168 to 1.5% depth of discharge (DoD); Step 3, OCV for 24 hours; Step 4, discharge at 1 mA/cm$^2$ for 10 seconds; Step 5, OCV for 1 hour; Step 6, discharge at 2 mA/cm$^2$ for 10 seconds; Step 7, OCV for 1 hour; Step 8, discharge at 3 mA/cm$^2$ for 10 seconds; Step 9, OCV for 1 hour; Step 10, repeat steps 2 through 9 for 10%, 30%, 50%, 70%, and 90% DoD.

Cyclic Voltammetry Characterization.

A four cycle protocol was used for cyclic voltammetry as follows: Cycle 0, set voltage to 3 V; Cycle 1, sweep up to 5V and then sweep down to 1V; Cycle 2, sweep up to 5V and then sweep down to 1V; Cycle 3, sweep up to 6V and then sweep down to 1V; Cycle 4, sweep up to 6V and then sweep down to 1V.

Capacity Characterization Method.

Assembled test cells were discharged at 37 degrees Celsius at C/100 with periodic high current pulse sequences. The low voltage cutoff was 1.5 V Area Specific Impedance.

Initial area specific impedance (ASI) was measured after setting the target state of charge (SOC) by discharging the cell at rate of C/10 and then applying a 10 second pulse at a rate of 5 C. ASI was calculated from the initial voltage (Vi) prior to the pulse and the final voltage (Vf) at the end of the pulse according to Formula (1), where A is the cathode area and i is the current:

$$ASI(\Omega \cdot cm^2) = \frac{(V_i - V_f) \times A}{i} \quad (1)$$

Figure 1B:
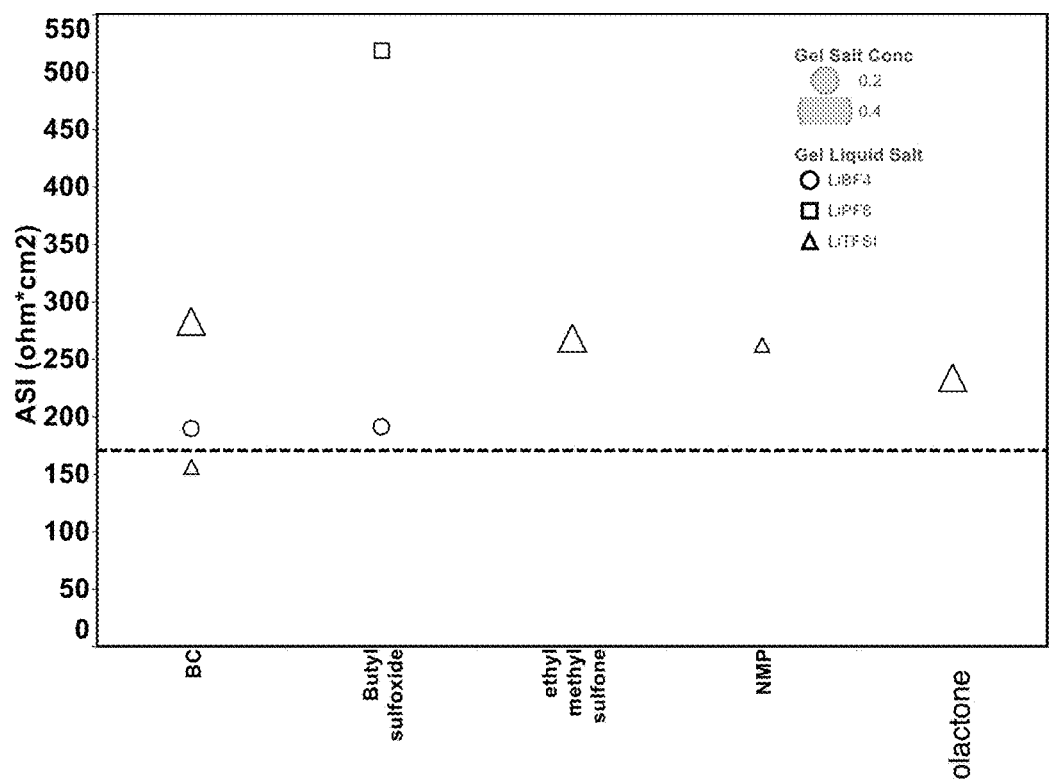
FIG. 1B illustrates the results of impedance testing of soft-solid electrolyte formulations according to certain embodiments of the invention.

In FIGS. 1A and 1B, "BC" refers to butylene carbonate, "NMP" refers to n-methyl-2-pyrrolidone, "H3" refers to the composite cathode formed according to the step-wise synthesis process disclosed herein, "trilayer" refers to assembly of the soft-solid electrolyte on either side of a separator as described above, and "Li" refers to the lithium electrode.

FIGS. 1A and 1B illustrate the results of lithium tetrafluoroborate (LiBF$_4$), lithium hexafluorophosphate (LiPF$_6$), and lithium bis-(trifluoromethanesulfonyl)imide (LiTFSI), combined with butylene carbonate, butyl sulfoxide, ethyl methyl sulfone, n-methyl-2-pyrrolidone, and γ-caprolactone. In these examples, the molar % of the salts was set at 20 molar %, 40 molar %, or 50 molar percent. FIGS. 1A and 1B provide the identities of the specific combinations and performance. FIG. 1A illustrates fairly consistent capacity values results for the inventive soft-solid electrolyte formulations as compared to electrolyte formulations.

FIG. 1B illustrates the results of area specific impedance testing. In these tests, the target state of charge was a 30% discharge (labeled 30% DoD for "Depth of Discharge"). FIG. 1B demonstrates that several of the formulations have an area specific impedance that is consistent with a desired value for the are specific impedance (represented by the dashed line).

Figure 2:
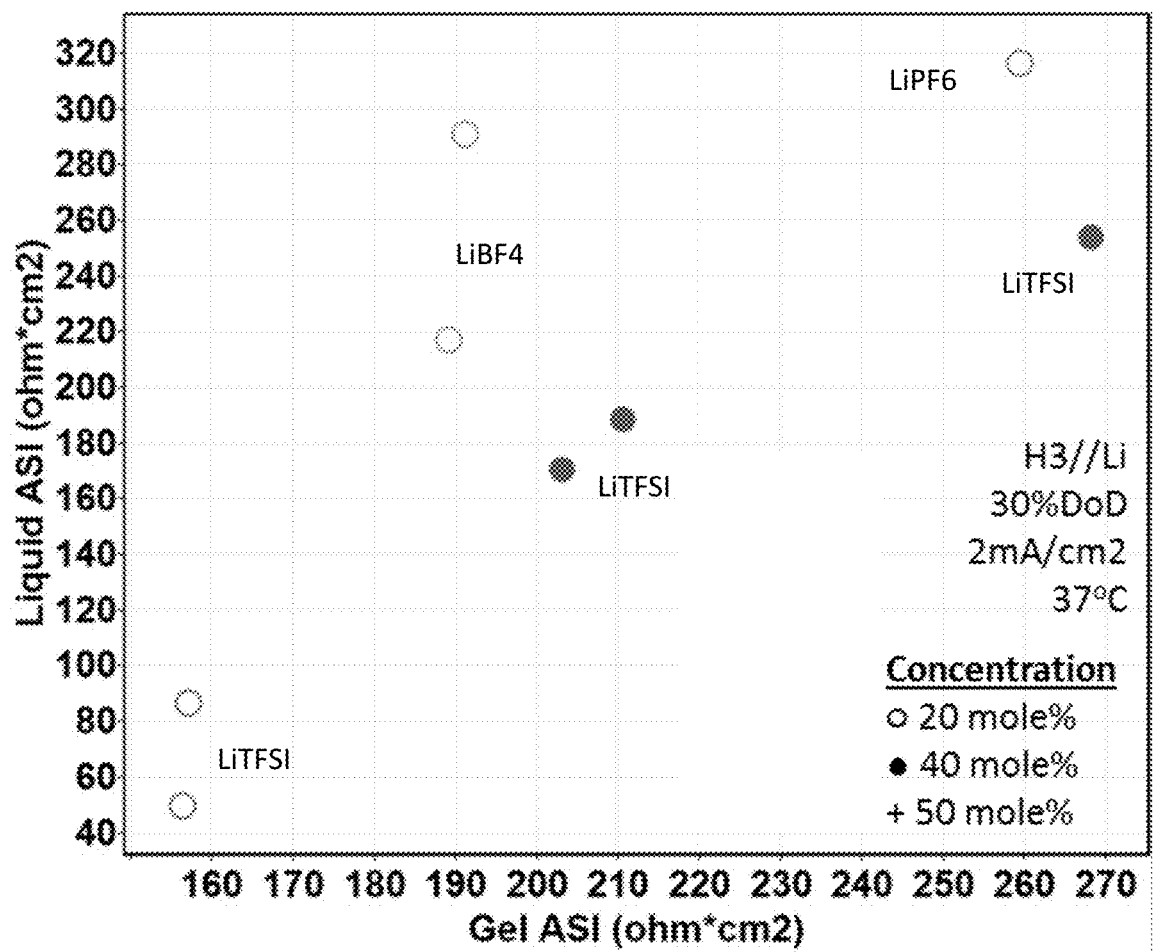
FIG. 2 illustrates the results of impedance testing of soft-solid electrolyte and liquid electrolyte formulations according to certain embodiments of the invention.

FIG. 2 illustrates a correlation plot showing the area specific impedance in a given liquid electrolyte with the same salt/solvent ratio and a given soft solid electrolyte. FIG. 2 demonstrates that the impedance of a soft-solid electrolyte film is not predictable from its liquid equivalent. While the absolute ASI values of a liquid electrolyte formulation cannot be directly compared to a soft-solid electrolyte formulation due to different cathode thickness and cell architecture, their relative performance as compared to the control on each axes can be compared. For example, the LiClO$_4$ formulation has a lower ASI in the gel than the control formulation. But in the liquid electrolyte, the LiClO$_4$ formulation has a higher ASI than the control formulation. The lack of correlation indicates a complex salt⌊solvent⌊polymer interaction.

Further, the soft-solid electrolyte formulations in FIG. 2 that have an unexpectedly low ASI (when compared to the performance of the corresponding liquid formulation) may be benefiting from improvements in interfacial resistance. The interface between two dissimilar materials can have an effect on ion and electron conduction. In certain embodiments, the cathode contains a polymer gel material that differs from the soft-solid electrolyte material. Certain of the cells containing these dissimilar materials demonstrate unexpectedly improved performance. The interface between the soft-solid electrolyte material and the cathode gel material may have lower resistance because of the unique combination of components of the gel and soft-solid at the interface where the two materials meet.

In the embodiments disclosed herein, substantial improvements in high voltage stability of soft-solid electrolytes enables the use of a PEO-based soft-solid electrolyte in high energy battery cells. Such high energy battery cells can include cathodes formed from high energy active materials, including but not limited to, lithium-manganese-nickel oxides (LMNO), lithium-manganese-nickel-cobalt oxides (NMC), lithium-cobalt-phosphates, and lithium-cobalt-oxides.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. A battery, comprising:
   an anode;
   a cathode comprising a lithium-containing electrode active material having a spinel structure or a layered oxide structure; and
   an electrolyte film including a lithium salt and a polymer soft-solid material, the polymer soft-solid material comprising a solvent selected from the group consisting of butylene carbonate, butyl sulfoxide, N-methyl-2-pyrrolidone, and γ-caprolactone and comprising an ethylene oxide polymer at a concentration of at least 15% of the total weight of the electrolyte film.

2. The battery of claim 1, wherein the solvent comprises butylene carbonate.

3. The battery of claim 1, wherein the solvent comprises butyl sulfoxide.

4. The battery of claim 1, wherein the solvent comprises N-methyl-2-pyrrolidone.

5. The battery of claim 1, wherein the solvent comprises γ-caprolactone.

6. The battery of claim 2, wherein the lithium salt comprises lithium bis(trifluoromethanesulfonyl)imide.

7. The battery of claim 1, wherein the solvent comprises butylene carbonate and about 20 molar percent lithium bis(trifluoromethanesulfonyl)imide.

8. The battery of claim 4, wherein the lithium salt comprises lithium bis(trifluoromethanesulfonyl)imide.

9. The battery of claim 1, wherein the solvent comprises N-methyl-2-pyrrolidone and about 20 molar percent lithium bis(trifluoromethanesulfonyl)imide.

10. The battery of claim 2, wherein the lithium salt comprises lithium tetrafluoroborate.

11. The battery of claim 1, wherein the solvent comprises butylene carbonate and about 20 molar percent lithium tetrafluoroborate.

12. The battery of claim 3, wherein the lithium salt comprises lithium tetrafluoroborate.

13. The battery of claim 1, wherein the solvent comprises butyl sulfoxide and about 20 molar percent lithium tetrafluoroborate.

* * * * *